United States Patent
Park et al.

(10) Patent No.: US 9,862,610 B2
(45) Date of Patent: Jan. 9, 2018

(54) METHODS AND SYSTEMS FOR THE CO-GENERATION OF GASEOUS FUELS, BIOCHAR, AND FERTILIZER FROM BIOMASS AND BIOGENIC WASTES

(75) Inventors: Ah-Hyung Alissa Park, New York, NY (US); Thomas E. Ferguson, Brooklyn, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 431 days.

(21) Appl. No.: 14/237,701

(22) PCT Filed: Aug. 7, 2012

(86) PCT No.: PCT/US2012/049868
§ 371 (c)(1),
(2), (4) Date: Sep. 18, 2014

(87) PCT Pub. No.: WO2013/022897
PCT Pub. Date: Feb. 14, 2013

(65) Prior Publication Data
US 2015/0033812 A1    Feb. 5, 2015

Related U.S. Application Data

(60) Provisional application No. 61/521,357, filed on Aug. 8, 2011, provisional application No. 61/680,114, filed on Aug. 6, 2012.

(51) Int. Cl.
*C01B 3/24* (2006.01)
*C01B 31/20* (2006.01)
(Continued)

(52) U.S. Cl.
CPC ............... *C01B 31/20* (2013.01); *B01J 6/001* (2013.01); *B01J 19/245* (2013.01); *B01J 23/745* (2013.01);
(Continued)

(58) Field of Classification Search
CPC ............................... C01B 31/20; C01B 32/50
(Continued)

(56) References Cited

U.S. PATENT DOCUMENTS 6,682,838 B2    1/2004   Stevens
2004/0028603 A1  2/2004   Reichman et al.
(Continued)

FOREIGN PATENT DOCUMENTS

WO    2010083041 A1    7/2010

OTHER PUBLICATIONS

International Search Report and the Written Opinion of the International Searching Authority, International Application PCT/US2012/049868, filed Oct. 23, 2012.

*Primary Examiner* — Paul Wartalowicz
(74) *Attorney, Agent, or Firm* — Murtha Cullina LLP; Anthony P. Gangemi

(57) ABSTRACT

Methods and systems for converting a biomass and biogenic wastes to hydrogen with integrated carbon dioxide capture and storage are disclosed. In some embodiments, the methods include the following: mixing at least one of a dry solid or liquid or liquid hydroxide and catalysts with a biomass to form a biomass mixture; heating the biomass mixture until the hydroxide and the biomass react to produce hydrogen, carbonate, biochar, and potentially fertilizer; calcining the carbonate or performing double replacement reactions of the carbonate to produce sequestration-ready carbon dioxide and a hydroxide; storing the carbon dioxide produced;
(Continued)

transferring the hydrogen produced to a fuel cell; and generating electricity with the fuel cell.

13 Claims, 3 Drawing Sheets

(51) Int. Cl.
    *C01B 3/06*     (2006.01)
    *C01D 7/07*     (2006.01)
    *B01J 23/745*     (2006.01)
    *B01J 23/755*     (2006.01)
    *B01J 35/00*     (2006.01)
    *C10L 9/08*     (2006.01)
    *B01J 6/00*     (2006.01)
    *B01J 19/24*     (2006.01)
    *C05D 9/00*     (2006.01)
    *H01M 8/0612*     (2016.01)
    *C01B 32/50*     (2017.01)
    *B01J 37/02*     (2006.01)

(52) U.S. Cl.
    CPC .......... *B01J 23/755* (2013.01); *B01J 35/0013* (2013.01); *C01B 3/06* (2013.01); *C01B 32/50* (2017.08); *C01D 7/07* (2013.01); *C05D 9/00* (2013.01); *C10L 9/086* (2013.01); *H01M 8/0612* (2013.01); *B01J 37/0209* (2013.01); *B01J 2219/24* (2013.01); *Y02E 60/36* (2013.01); *Y02P 30/30* (2015.11)

(58) Field of Classification Search
    USPC .............................................. 423/648.1, 650
    See application file for complete search history.

(56) References Cited

U.S. PATENT DOCUMENTS

| | | |
|---|---|---|
| 2004/0111968 A1 | 6/2004 | Day et al. |
| 2005/0163704 A1 | 7/2005 | Reichman et al. |
| 2007/0243128 A1 | 10/2007 | Reichman et al. |
| 2010/0178278 A1* | 7/2010 | Luo .................... A61L 27/46 |
| | | 424/93.7 |
| 2011/0076226 A1 | 3/2011 | Reichman et al. |

* cited by examiner

METHODS AND SYSTEMS FOR THE CO-GENERATION OF GASEOUS FUELS, BIOCHAR, AND FERTILIZER FROM BIOMASS AND BIOGENIC WASTES

CROSS REFERENCE TO RELATED APPLICATION(S)

This application claims the benefit of U.S. Provisional Application Nos. 61/521,357 filed Aug. 8, 2011, and 61/680,114, filed Aug. 6, 2012, each of which is incorporated by reference as if disclosed herein in its entirety.

BACKGROUND

In 2010, it was reported that fossil fuels accounted for 80-90% of global energy consumption, and they will continue to be the predominant source of energy for the foreseeable future, considering that they are still the most abundant and affordable source of energy. Rapid economic growth in developing countries such as China and India will further amplify the increasing demand for fossil fuels. Unfortunately, fossil fuel resources are not uniformly distributed in the world, and thus many nations depend on importation for much of their fuel supply. The utilization of fossil fuels also results in the emission of many environmentally detrimental byproducts, including greenhouse gases. Therefore, the issues of energy security and imbalances in the global carbon cycle brought about by anthropogenic carbon emissions have prompted much investigation into new sustainable fuel and energy generation paradigms. Achieving a sustainable energy pathway requires both a multifaceted technological solution and the use of various energy sources. In particular, the development of efficient energy conversion schemes is desired for alternative feedstocks, rather than simply applying conventional fossil energy conversion technologies to them.

As an alternative energy resource, biomass is a feedstock that is renewable, carbon neutral, diverse, and diffusely spread throughout the world. In the United States, the U.S. Energy Information Administration (EIA) predicts that energy consumption from biomass will increase 2.9% annually from the period of 2009 to 2035, comprising 4.6% of U.S. energy consumption by 2035. For the developing world, which the EIA is projecting to have an 84% increase in energy demand versus a 14% increase for the developed world by 2035, biomass is a crucial energy resource. In 2001, nearly 50% of Africa's total primary energy supply was from biomass and waste. Biomass will therefore be an important energy feedstock for decades to come; however, it must be utilized in a sustainable and efficient manner.

As biomass is a very low energy density feedstock, thermochemical pathways have been developed to increase its energy density. One pathway is through the conversion of biomass to biocrude via pyrolysis. Biomass feedstocks can also be converted into a synthesis gas, i.e., carbon monoxide and hydrogen, through conventional or supercritical gasification processes, the latter being more well-suited to biomass feedstocks with greater than 35 wt % moisture content. Fischer-Tropsch synthesis can then be employed to make hydrocarbon fuels from the synthesis gas. Most of these thermochemical processes can be made to be highly flexible, allowing for a range of fuels to be made from a wide variety of biomass feedstocks. However, there has been less investigation into processes where biomass can be utilized as a feedstock in a local, distributed generation scheme, one that does not require increasing the energy density of the feedstock through fuel conversion to make fuel transportation feasible. Distributed biomass conversion is particularly attractive for the developing world and rural communities, as many of these regions lack the infrastructure necessary for a large scale grid. The aforementioned thermochemical conversion technologies, such as gasification and pyrolysis, can also be scaled down into small units, but due to their high operating temperatures and pressures, the main difficulties of their distributed small-scale deployment will lie in the need for skilled operators and the issue of safety. Therefore, the development of a biomass conversion scheme that can safely be operated at lower temperature and pressure is desired.

Several studies have been conducted to investigate one-step hydrogen production methods from biomass primarily through the addition of alkaline and alkaline earth hydroxides, which transfer the carbon in the biomass to a stable, solid carbonate while producing hydrogen. Thus, unlike gasification and pyrolysis where both carbon and hydrogen remain in the fuel streams, this technology allows for inherent carbon management by fixing carbon in a solid carbonate matrix while maximizing hydrogen production. Unfortunately, known processes involve an energy-intensive pretreatment process to improve mass transfer during the reaction, which entails the impregnation of an aqueous NaOH solution onto biomass, followed by the evaporation of excess water. Therefore, the overall energetics of the biomass conversion is not sustainable.

Others have investigated hydrogen conversion from cellulose using an ionic catalyst containing a base. These solid-solid cellulose systems achieved as high as 60% hydrogen conversion; however, with this approach, carbon monoxide concentration in the gaseous product stream was as high as 700 ppm under similar reaction conditions. While these types of schemes do not require the need for the aqueous NaOH solution-based pretreatment process, their catalyst preparation step did necessitate the removal of water. It was reported that greater conversions to hydrogen are observed as the sodium content in the catalyst is increased.

Another known technology converts biomass to hydrogen but requires a NaOH solution and the subsequent removal of water from the system. The removal of water is very energy intensive so that overall it would not be environmentally sustainable.

SUMMARY

In methods and systems according to the disclosed subject matter, biomass is mixed and reacted with alkali metal hydroxides, such as KOH, NaOH, and LiOH, to form hydrogen and small amounts of carbon monoxide and/or carbon dioxide. Rather, the carbon from the biomass goes to a solid alkali carbonate. For example, the following is the reaction for hydrogen production from cellulose via alkaline hydrothermal treatment:

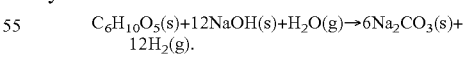

$C_6H_{10}O_5(s)+12NaOH(s)+H_2O(g) \rightarrow 6Na_2CO_3(s)+12H_2(g)$.

The produced alkali carbonate can be calcined to recover the hydroxide while the pure stream of carbon dioxide formed can be easily sequestered via a number of carbon storage techniques. In some embodiments, in addition to hydroxides, nickel and/or iron based catalysts are mixed with biomass to facilitate the conversion of biomass to hydrogen.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
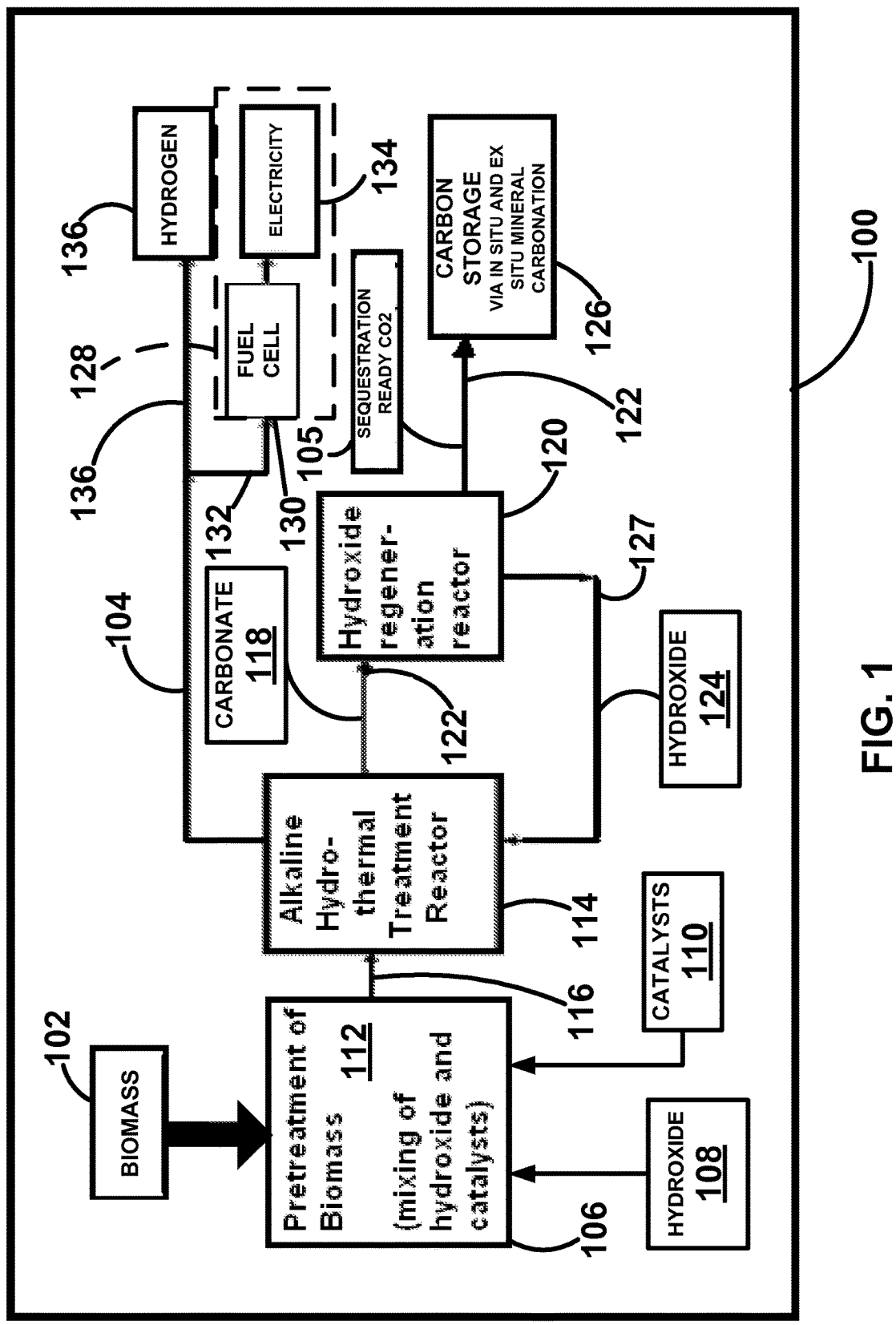
FIG. 1 is a schematic diagram of methods and systems according to some embodiments of the disclosed subject matter.

Referring now to FIG. 1, aspects of the disclosed subject matter include a system 100 for converting a biomass 102 to hydrogen 104 and carbon dioxide 105.

System 100 includes a pretreatment module 106 for mixing at least one of a dry solid or liquid hydroxide 108 and one or more catalysts 110 with biomass 102 to form a biomass mixture 112. In some embodiments, catalysts 110 include nickel and iron. In some embodiments, hydroxide 108 is an alkali metal hydroxide or their solutions, e.g., such as one of KOH, NaOH, LiOH, and a combination thereof. In some embodiments, basic ionic liquids or other organic solvents are used as a hydroxide source.

System 100 includes an alkaline hydrothermal treatment reactor 114 in fluid communication, e.g. via a conduit 116, with pretreatment module 106. Biomass mixture 112 and water vapor, i.e., steam, is heated in alkaline hydrothermal treatment reactor 114 until hydroxide 108 and biomass 102 react to produce hydrogen 104 and a carbonate 118.

System 100 includes a hydroxide regeneration reactor 120 in fluid communication, e.g. via a conduit 122, with alkaline hydrothermal treatment reactor 114. Carbonate 118 produced in alkaline hydrothermal treatment reactor 114 is calcined or undergoes double displacement reactions in hydroxide regeneration reactor 120 to produce carbon dioxide 105 and a hydroxide 124. Carbon dioxide 105 is produced by releasing it from carbonate 118 during the calcining process. Carbon dioxide 105, which is sequestration-ready, is collected and typically stored at a carbon storage module 126 via in-situ or ex-situ mineral carbonation. In some embodiments, hydroxide 124 is recycled to alkaline hydrothermal treatment reactor 114 and/or pretreatment module 106 via a conduit 127. By using steam, instead of a liquid hydroxide system, the energy requirement for hydroxide regeneration is minimized.

System 100 includes an energy generation module 128 including a fuel cell 130 that utilizes at least a first portion 132 of hydrogen 104 to generate electrical energy 134. In some embodiments, at least a second portion 136 of hydrogen 104 is collected and stored.

Figure 2:
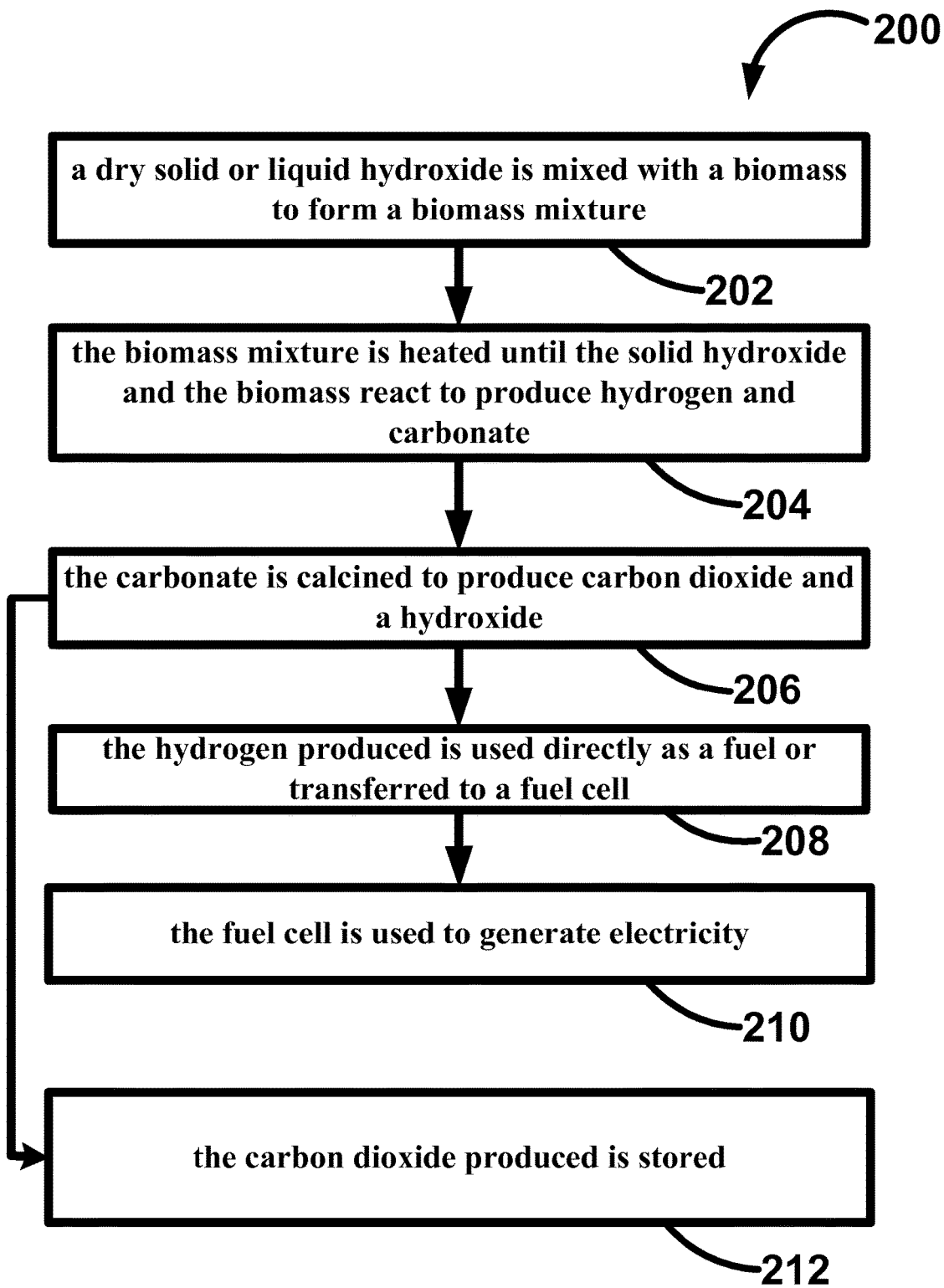
FIG. 2 is a chart of a method according to some embodiments of the disclosed subject matter.

Referring now to FIG. 2, some embodiments of the disclosed subject matter include a method 200 of converting a biomass to hydrogen and carbon dioxide. At 202, a dry solid or liquid hydroxide is mixed with a biomass to form a biomass mixture. In some embodiments, the biomass is one of algae, *haematococcus pluvialis*, farming residues, and other materials containing cellulose or glucose. There is no need for an energy-intensive drying process of biomass, and thus wet biomass materials can directly be used. In some embodiments, the dry solid or liquid hydroxide is an alkali metal hydroxide, e.g., KOH, NaOH, LiOH, $Ca(OH)_2$, $Mg(OH)_2$, or a combination thereof. In some embodiments, the dry solid or liquid hydroxide is a liquid base such as an ionic liquid or a basic organic solvent. Typically, but not always, an amount of the hydroxide is selected so that the generation of carbon monoxide produced when the hydroxide and the biomass react is minimized. In some embodiments, the amount of the hydroxide is selected so that a stoichiometric ratio of the hydroxide to the biomass is about 1:1. In some embodiments, the stoichiometric ratio of the hydroxide to the biomass is as much as about 10:1. Depending on the selection of the hydroxide, i.e., ammonium based, one of the byproducts could be the fertilizer.

Figure 3:
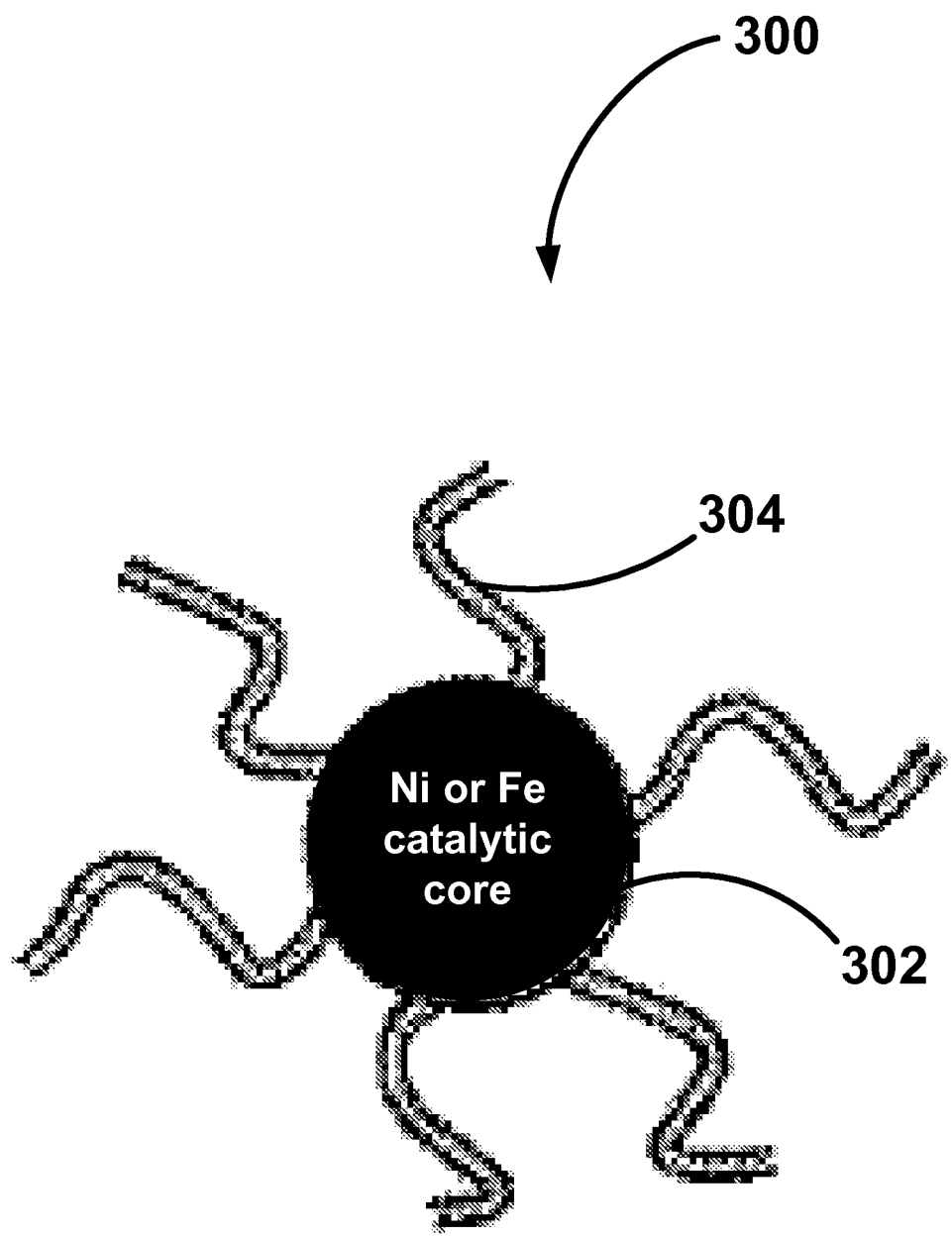
FIG. 3 is a schematic diagram of a nanoparticle ionic material according to some embodiments of the disclosed subject matter.

In some embodiments, one or more catalysts, e.g., nickel or iron-based, are also mixed with the biomass at 202. In some embodiments, the catalysts will be directly embedded on to the biomass particles. In some embodiments, the catalysts will be loaded inside inorganic nanofibers, e.g., silica, alumina, carbon, etc. Referring now to FIG. 3, in some embodiments, the catalysts include nanoparticle organic hybrid materials (NOHMs) 300, each of which includes a nanoparticle core 302 and molecular organic polymeric corona 304. Nanoparticle core 302 typically includes at least one of nickel and iron, but can include other materials that facilitate the conversion of biomass to hydrogen.

Referring again to FIG. 2, at 204, water vapor, i.e., steam is injected into the biomass mixture and it is heated until the hydroxide and the biomass react to produce hydrogen and carbonate. In some embodiments, the biomass mixture is heated to about 200 to about 300 degrees Celsius and at ambient pressure. In some embodiments, a temperature of about 250 degrees Celsius is maintained during the heating process. At 206, the carbonate is calcined to produce carbon dioxide and a hydroxide. At 208, the hydrogen produced is transferred to a fuel cell. At 210, the fuel cell is used to generate electricity. At 212, the carbon dioxide produced is stored, e.g., via in-situ or ex-situ mineral carbonation.

Methods and systems according to the disclosed subject matter offer benefits over known technologies. Due to issues of environmental sustainability associated with anthropogenic carbon emission and energy security, there is a strong interest to develop a new generation of energy conversion technologies that utilize domestic energy sources. As a feedstock, biomass represents a major potential for the sustainable generation of energy worldwide because it is a widespread and carbon neutral resource. However, biomass has a much lower energy density as compared to fossil fuels. For this reason, in order for energy generation schemes involving biomass to be viable, they must be implemented within close proximity to the feedstock. Therefore, a small distributed energy generation system that can be operated without special training is an ideal solution to the biomass conversion technologies. This approach will bring about a great paradigm shift in energy generation and utilization since this will allow conventional energy consumers to become energy producers. The public will be able to make decisions on how energy is generated and how a scope of environmental sustainability can be incorporated into the energy conversion technology.

One of the main benefits of technology according to the disclosed subject matter is that chemical conversion can be achieved at temperatures of about 200 to about 300 degrees Celsius and ambient pressure, which is significantly lower than gasification, i.e., greater than 700 degrees Celsius at up to 10 MPa, or pyrolysis, i.e., 370 to 530 degrees Celsius at 0.1-0.5 MPa, conditions. The moderate reaction conditions of the methods and systems according to the disclosed technology make the design of a compact reactor for a distributed energy generation system feasible.

Biomass including biogenic wastes is one of the important energy resources for the sustainable future. Therefore, there are a number of biomass related technologies being developed to convert biomass into fuels, e.g., gasification and pyrolysis. However, due to the low energy density of biomass, the development of such technologies can be limited by the transportation distance. Also, a large scale centralized energy conversion technology requires large capital investment which will slow down its commercial deployment. Technology according to the disclosed subject matter eliminates the problem of large capital investment so that the commercialization of such technology will be much easier and faster. Furthermore, due to the same reason, smaller businesses can now become energy producers while the traditional energy sector was led by only the large energy companies.

Technology according to the disclosed subject matter of converting biomass into biofuels and biopower allows rural areas to leapfrog to the next-generation energy infrastructure while avoiding the current fossil energy based system. With the compact size and low cost of biomass, this technology provides benefits ranging from a reduction in oil dependence to a reduction of carbon dioxide emissions or even to a creation of negative emissions. Most of the biomass is low in energy density making it undesirable to transport the biomass long distances before it is converted to high value energy sources. Thus, the biorefining systems according to the disclosed subject matter, which are compact and mass-producible, are suitable for small rural and farm-scale applications while ensuring the maximum efficiency in energy extraction from biomass. They are able to cogenerate $H_2$ and electricity for various applications including domestic and transportation uses. Technology according to the disclosed subject matter can equip farmers and local communities with systems that offer energy with improved environmental sustainability. Since the units are designed to be compact, the initial capital investment may be very small compared to conventional power plants.

The proposed project is transformational, since the alkaline hydrothermal treatment of biomass is a new concept that has not been fully developed. Since the process itself requires relatively low operating temperature and pressure and an anticipated low initial capital investment, once developed, the technology according to the disclosed subject matter can be implemented in rural areas at a rapid pace. Technology according to the disclosed subject matter offers the opportunity to change the energy infrastructure from current large-scale power generation to small distributed forms and will provide much needed energy and environmental sustainability.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of converting a biomass to hydrogen and carbon dioxide, said method comprising:
   mixing a dry solid hydroxide and dry solid catalytic material with a biomass to form a biomass mixture;
   centrifugally embedding said hydroxide and said catalytic material onto said biomass;
   heating said biomass mixture and water vapor until said hydroxide and said biomass react to produce hydrogen and carbonate; and
   calcining said carbonate or performing double replacement reactions of said carbonate to produce carbon dioxide and a hydroxide.

2. The method according to claim 1, wherein said dry solid hydroxide is an alkali metal hydroxide or their solutions.

3. The method according to claim 2, wherein said alkali metal hydroxide is one of KOH, NaOH, LiOH, $Ca(OH)_2$, $Mg(OH)_2$, $NH_4OH$ and a combination thereof.

4. The method according to claim 1, wherein said hydroxide and said catalytic material are included as a nanoparticle organic hybrid material (NOHM), including a catalytic nanoparticle core and molecular organic polymeric corona.

5. The method according to claim 1, wherein said biomass is one of algae, *haematococcus pluvialis*, farming residues, and other materials containing cellulose or glucose.

6. The method according to claim 1, wherein said biomass mixture is heated to about 200 to about 300 degrees Celsius and at ambient pressure.

7. The method according to claim 1, wherein an amount of said hydroxide is selected so that the generation of carbon monoxide produced when said hydroxide and said biomass react is minimized.

8. The method according to claim 1, wherein an amount of said hydroxide is selected so that a stoichiometric ratio of said hydroxide to said biomass is about 1:1.

9. The method according to claim 1, further comprising: transferring said hydrogen produced to a fuel cell; and generating electricity with said fuel cell.

10. The method according to claim 1, further comprising: storing said carbon dioxide produced via in-situ or ex-situ mineral carbonation.

11. The method according to claim 1, further comprising: co-producing at least one of a biochar and a fertilizer while producing hydrogen.

12. A method of converting a biomass to hydrogen and carbon dioxide, said method comprising:
    mixing a dry solid nanoparticle organic hybrid material (NOHM) including a plurality of hydroxyl functional groups and a catalytic nanoparticle core with a biomass to form a biomass mixture;
    heating said biomass mixture and water vapor to about 200 to about 300 degrees Celsius and at ambient pressure until said hydroxide and said biomass react to produce hydrogen, carbonate, and by-products such as at least one of a biochar and a fertilizer; and
    calcining said carbonate or performing double replacement reactions of said carbonate to produce carbon dioxide and a hydroxide.

13. The method according to claim 12, further comprising:
    storing said carbon dioxide produced;
    transferring said hydrogen produced to a fuel cell; and
    generating electricity with said fuel cell.

* * * * *